United States Patent
Luo et al.

(10) Patent No.: US 9,654,028 B1
(45) Date of Patent: May 16, 2017

(54) SYSTEM AND METHOD FOR MAXIMIZING EFFICIENCY OF THREE-PHASE INVERTER-BASED POWER SYSTEMS

(71) Applicant: Eaton Corporation, Cleveland, OH (US)

(72) Inventors: Cheng Luo, Changning District (CN); Huiting Xin, Changning District (CN); Xinyu Wang, Changning District (CN); Xiaxia Hu, Changning District (CN); Han Li, Changning District (CN)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 15/079,265

(22) Filed: Mar. 24, 2016

(51) Int. Cl.
*H02M 1/08* (2006.01)
*H02M 7/538* (2007.01)
*H02M 7/537* (2006.01)
*H02J 3/38* (2006.01)
(Continued)

(52) U.S. Cl.
CPC ............ *H02M 7/537* (2013.01); *H02J 3/383* (2013.01); *H02M 1/08* (2013.01); *H02M 7/53871* (2013.01); *H02M 2001/0029* (2013.01); *H02M 2001/0054* (2013.01)

(58) Field of Classification Search
CPC ........... H02M 7/53871; H02M 27/085; H02M 2001/0029; H02M 2001/0054
See application file for complete search history.

(56) References Cited

U.S. PATENT DOCUMENTS 5,757,636 A    5/1998    Fletcher
7,307,401 B2    12/2007    Gataric et al.
7,391,181 B2    6/2008    Welchko et al.
(Continued)

FOREIGN PATENT DOCUMENTS

EP        2887529 A1    6/2015

OTHER PUBLICATIONS

Tamura Hiroshi; WO2015137035_ENGLISH; Sep. 17, 2015; Hitachi Automotive System.*
(Continued)

*Primary Examiner* — Matthew Nguyen
*Assistant Examiner* — Ishrat Jamali
(74) *Attorney, Agent, or Firm* — Ziolkowski Patent Solutions Group, SC

(57) ABSTRACT

A system and method for operating an inverter to maximize an overall efficiency of a power system is disclosed. A power system includes an inverter having an arrangement of switching devices that are selectively operable in On and Off states to invert a DC output to an AC output having controlled current and voltage. A controller selectively controls operation of the arrangement of switching devices via a discontinuous pulse width modulation (DPWM) scheme, so as to regulate an average voltage of the AC output. In controlling operation of the arrangement of switching devices via the DPWM scheme, the controller is programmed to generate a DPWM reference waveform having an initial phase angle, determine a system efficiency of the power system during operation, calculate an optimal phase angle for the DPWM reference waveform based on the determined system efficiency, and generate a DPWM reference waveform having the calculated optimal phase angle.

20 Claims, 4 Drawing Sheets

(51) Int. Cl.
   *H02M 7/5387*   (2007.01)
   *H02M 1/00*     (2006.01)

(56) References Cited

U.S. PATENT DOCUMENTS

| | | |
|---|---|---|
| 7,432,683 B2 | 10/2008 | Welchko et al. |
| 7,629,764 B2 | 12/2009 | Shoemaker et al. |
| 7,723,946 B2 | 5/2010 | Welchko et al. |
| 8,054,032 B2 | 11/2011 | Chakrabarti et al. |
| 8,100,799 B2 | 1/2012 | Welchko et al. |
| 9,118,260 B2 * | 8/2015 | Gautier et al. ........ H02P 27/085 |
| 2015/0236628 A1 | 8/2015 | Wang et al. |

OTHER PUBLICATIONS

Van Nho et al., "Optimized Discontinuous PWM Algorithm With Variable Load Power Factor for Multilevel Inverters," 2006 Power Electronics Specialist Conference, pp. 1-7.

Nguyen et al., "A Direct Digital Technique Implementation of General Discontinuous Pulse Width Modulation Strategy," IEEE Transactions on Industrial Electronics, vol. 58, No. 9, Sep. 2011, pp. 4445-4454.

* cited by examiner

SYSTEM AND METHOD FOR MAXIMIZING EFFICIENCY OF THREE-PHASE INVERTER-BASED POWER SYSTEMS

BACKGROUND OF THE INVENTION

Embodiments of the invention relate generally to electronic power conversion and, more particularly, to a three-phase inverter based power system and method of controlling thereof that minimizes losses in the inverter during operation and maximizes overall system efficiency.

Photovoltaic (PV) power systems are power systems that employ a plurality of solar modules to convert sunlight into electricity. PV systems include multiple components, including photovoltaic modules, mechanical and electrical connections and mountings, and means of regulating or modifying the electrical output. One common arrangement in PV systems is for several PV modules to be connected in series to form a PV string, with multiple PV strings in a PV system then being combined in parallel to aggregate the current in a PV array. Photovoltaic (PV) cells generate direct current (DC) power, with the level of DC current being dependent on solar irradiation and the level of DC voltage dependent on temperature. For a typical one-stage solar inverter system, the DC output of the PV panel is fed to the DC bus of a power inverter through necessary isolation devices such as DC breakers, DC fuses, etc., with a DC pre-charge circuit often being employed to charge a DC bus capacitor during start-up. The AC output of the power inverter is then normally fed through line reactors and RC filters and is then connected to the grid through a main isolation transformer.

With respect to the power inverter, the inverter is often constructed as a two-level, three-phase inverter that includes six silicon carbide (SiC) MOSFETs each of which serves as a switch in the inverter. The SiC MOSFETs of the power inverter are typically controlled through pulse width modulation (PWM) to regulate the average inverter output voltage. The PWM is often generated by comparing a reference wave to a high-frequency carrier wave, with the carrier being a triangle waveform at a few kHz for solar power inverters. This switching frequency for the SiC MOSFETs can be higher than the switching frequency for traditional Si devices.

It is recognized that during operation of the PV power system, losses occur that are associated with the power inverter and other system components (e.g., reactor losses and filter losses), and that such losses can negatively impact the efficiency and performance of the PV power system. With respect to the power inverter losses, prior art systems have been designed to minimize such losses by utilizing a discontinuous pulse width modulation (DPWM) scheme for controlling switching of the SiC MOSFETs—with the DPWM providing for a non-switching period in the fundamental cycle and avoidance of switching at high current at differing power factors (if the phase angle of the DPWM reference waveform is controlled) in order to reduce switching losses in the power inverter.

However, while previously implemented techniques may have adequately addressed power inverter losses in PV power systems by utilizing a DPWM scheme where the phase angle of the DPWM reference waveform is controlled to reduce switching losses, such optimization of the power inverter operation may not result in minimizing overall losses in the PV power system. That is, while operation of the power inverter via DPWM with different phase angles will result in reducing switching losses in the power inverter, the use of different phase angles in the reference waveform results in different output current harmonic components being generated, and these current harmonic components can increase the level of line reactor losses and filter losses in the PV power system. Accordingly, the total PV power system losses may not be optimized if only the power inverter losses are optimized based on a determined operating power factor of the system.

It would therefore be desirable to provide a PV power system and method of operation thereof that utilizes DPWM to reduce power inverter losses in the system, but with the DPWM being applied and optimized to maximize the overall PV power system efficiency for full KVA range including low power factor operating conditions. It would further be desirable that, in maximizing the system efficiency, the SiC MOSFET switch stress would be effectively reduced and the reliability thereof would be increased.

BRIEF DESCRIPTION OF THE INVENTION

In accordance with one aspect of the invention, a power system includes a three-phase inverter having a DC link that receives a DC output from a power source and an arrangement of switching devices connected to the DC link and selectively operable in On and Off states to invert the DC output to an AC output having controlled current and voltage. The power system also includes a controller programmed to selectively control operation of the arrangement of switching devices via a discontinuous pulse width modulation (DPWM) scheme, so as to regulate an average voltage of the AC output. In controlling operation of the arrangement of switching devices via the DPWM scheme, the controller is further programmed to generate a DPWM reference waveform having an initial phase angle, determine a system efficiency of the power system during operation thereof, calculate an optimal phase angle for the DPWM reference waveform based on the determined system efficiency, and generate a DPWM reference waveform having the calculated optimal phase angle.

In accordance with another aspect of the invention, a controller-based method of controlling a three-phase inverter in a power system includes determining an operating power factor of the three-phase inverter, determining an overall system efficiency of the power system during operation thereof, and controlling operation of the three-phase inverter via a discontinuous pulse width modulation (DPWM) control scheme, with an optimal phase angle of a DPWM reference waveform of the DPWM control scheme being determined based on the determined power factor and overall system efficiency. Controlling operation of the arrangement of three-phase inverter via a DPWM scheme with a DPWM reference waveform having the optimal phase angle maximizes the system efficiency of the power system over a full KVA operating range.

In accordance with yet another aspect of the invention, a controller for controlling operation of a three-phase inverter in a power system includes an efficiency calculation module programmed to determine an operating power factor of the three-phase inverter, determine an overall system efficiency of the power system during operation thereof, and generate an output comprising the determined operating power factor and overall system efficiency. The controller also includes an adaptive DPWM phase angle module operably connected to the efficiency calculation module to receive the output therefrom, the adaptive DPWM phase angle module programmed to determine an optimal phase angle of a DPWM reference waveform in a DPWM control scheme based on the determined operating power factor and overall system efficiency. The controller further includes a DPWM modulator programmed to generate gating signals for controlling the three-phase inverter, the gating signals generated according to the DPWM control scheme having the DPWM reference waveform at the optimal phase angle.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENTS

The embodiments of the invention set forth herein relate to a system and method for maximizing efficiency of a three-phase inverter-based power system. A DPWM scheme with adaptive phase angles is utilized to control operation of a three-phase inverter so as to maximize an efficiency of the power system as a whole.

While embodiments of the invention are described below with respect to an inverter utilized/incorporated as part of a PV system—i.e., a "PV inverter"—it is recognized that embodiments of the invention encompass general three-phase power converters/inverters for any application. Additionally, while the PV inverter is described as including switching devices therein in the form of silicon carbide (SiC) MOSFETs, it is recognized that embodiments of the invention encompass general three-phase power converters/inverters that include other types of switching devices therein, such as insulated-gate bipolar transistors (IGBTs) for example. Accordingly, embodiments of the invention are not meant to be limited to the specific embodiments set forth in greater detail here below.

Figure 1:
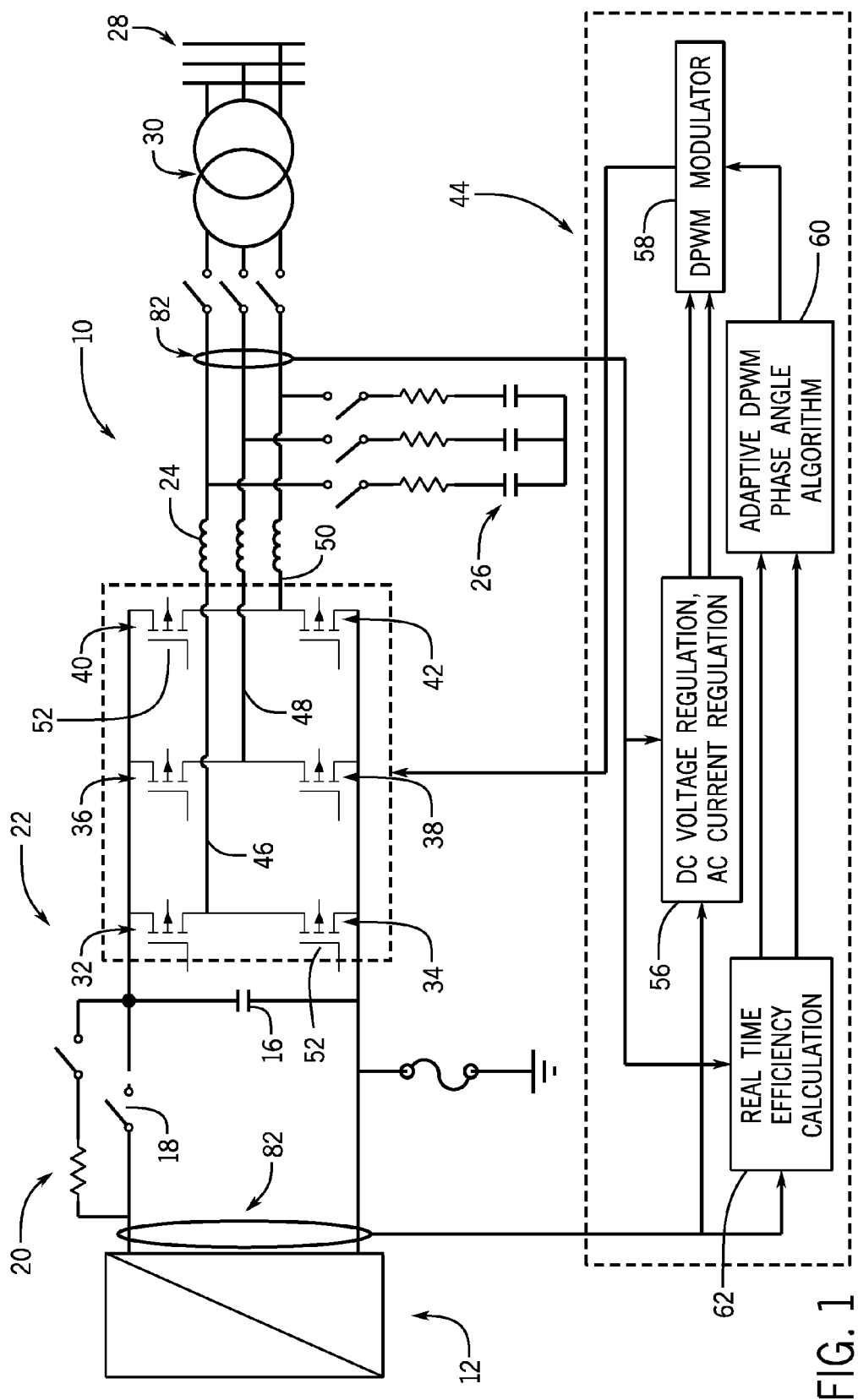
FIG. 1 is a schematic illustration of a PV power system that includes a three-phase PV inverter, according to an embodiment of the invention.

Referring to FIG. 1, a photovoltaic (PV) power system 10 is illustrated according to an embodiment of the invention. The PV power system 10 includes one or more PV arrays 12 each configured to generate a DC power responsive to received solar irradiation. Each of the PV arrays 12 is composed of a plurality of parallelly connected PV strings (not shown), with each of the PV strings including a plurality of modules (not shown) therein that are connected in series to generate a DC power. While only one PV array 12 is shown in FIG. 1, it is recognized that the number of PV arrays in PV power system 10 can vary, with two, three, four or more PV arrays 12 (e.g., eight PV arrays) being included in the PV power system 10, for example. In each PV array, the PV strings are electrically connected in parallel to a DC link or bus 14 that is often housed in a combiner box (not shown). According to one embodiment, the DC link 14 is in the form of a DC link circuit that includes a DC capacitor 16, DC breaker 18 and a DC pre-charge circuit 20 that charges the DC capacitor 16 during start-up.

Also included in PV system 10 is a PV inverter 22 that is electrically connected to the DC link 14. The PV inverter 22 operates to perform the conversion of the variable DC output of the PV array 12 into an AC power that can be output and fed through line reactors 24 and RC filters 26 and then connected to a commercial electrical system (i.e., grid) 28 through a main isolation transformer 30, for example. According to embodiments of the invention, a three-phase PV inverter 22 may have a single stage or two stage design—with the PV inverter performing only a DC/AC inversion (single stage) or providing both a DC/DC conversion and a DC/AC inversion (two stage). For performing a controlled DC/AC inversion, the PV inverter 22 includes a plurality of switching devices 32, 34, 36, 38, 40, 42 that are selectively controlled by an associated inverter controller 44 in order to output a desired AC power—with inverter controller 44 being coupled to the switching devices via respective control lines. As shown in FIG. 1, switching devices 32, 34 are associated with a first output phase 46, switching devices 36, 38 are associated with a second output phase 48, and switching devices 40, 42 are associated with a third output phase 50.

According to an exemplary embodiment, each switching device 32-42 of the PV inverter comprises a silicon carbide (SiC) MOSFET 52 (having an anti-parallel or internal body diode therein). SiC is a crystalline substance that has material properties that make it an attractive alternative to silicon for high voltage, and high power applications. For example, SiC has a large bandgap that provides a very low leakage current, which facilitates elevated temperature operation. In fact, semiconductor devices manufactured on a SiC substrate can withstand temperatures in excess of 200 degrees C. SiC also has a high breakdown field that is about ten times that of silicon and a thermal conductivity that is about three times that of silicon, allowing higher power densities to be accommodated with SiC circuits. Further, SiC's high electron mobility enables high-speed switching, such as a switching frequency in excess of 50 kHz, with some SiC circuits capable of achieving at least ten times switching performance gains over comparable silicon switching devices. Thus, SiC has been considered as an advantageous material for use in the manufacture of next generation power semiconductor devices.

According to an exemplary embodiment, inverter controller 44 is a PWM controller that independently controls switching of SiC MOSFETs 52, with the controller 44 being programmed to generate a discontinuous PWM (DPWM) signal for controlling switching of the SiC MOSFETs 52. The DPWM signal is a carrier-based PWM with a discontinuous reference waveform, with the DPWM reference being generated by adding a zero sequence waveform to the base sine wave. The reference waveform is clamped to high or low for one third of the fundamental cycle, and so by comparing the DPWM reference to the carrier signal, for one third of the fundamental cycle there is no switching for the SiC MOSFETs 52. For generating the DPWM signal, a DC voltage/AC current regulator 56 and a DPWM modulator 58 are provided as part of the controller 44 to generate and output gating signals to the PV inverter 22 in the form of a DPWM signal—with the DC voltage/AC current regulator 56 generating the modulation depth and phase (fundamental phase angle) for generating the DPWM reference wave. Also included as part of the controller 44 are an adaptive DPWM phase angle module 60 and real time efficiency calculation module 62, whose operation will be explained in further detail here below.

Figure 2:
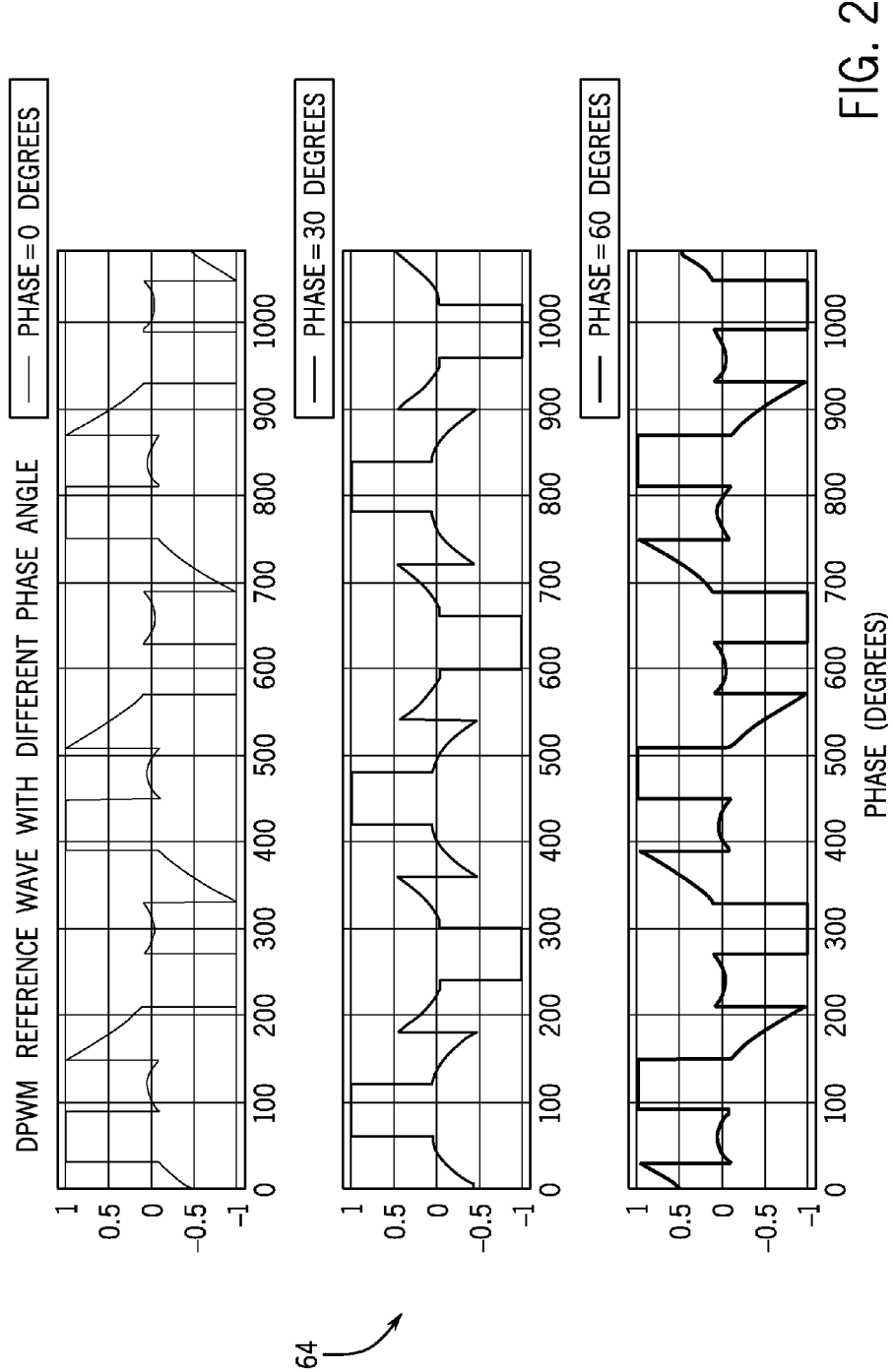
FIG. 2 illustrates DPWM reference waveforms with phase angles of varying degrees that may be employed via implementing of an adaptive DPWM phase angle algorithm, according to an embodiment of the invention.

With respect to generating the DPWM signal, it is recognized that it may be desireable to alter the DPWM reference phase angle in order to improve the performance of the PV inverter 22 and reduce the stresses imposed on the SiC MOSFETs thereof—with such altering of the phase angle being achieved by positioning the zero sequence in different phase angle with regard to the base sine wave. That is, it is recognized that switching losses in the PV inverter 22 (i.e., switching losses of the MOSFETs and diodes) are determined by the instantaneous voltage and current at the moment of switching and, by using a DPWM with different phase angles, it is possible to shift the phase angle such that the center of the non-switching period of DPWM is aligned with the peak current and in order to further avoid overlap of both high voltage and high current at the switching, so as to reduce the switching losses. A DPWM reference with 30 degrees phase angle is the conventional DPWM scheme, as it has symmetric shape and is widely used in many applications, but by positioning the zero sequence in different phase angle with regard to the base sine wave, a DPWM reference at differing phase angles can be created, such as a DPWM reference having a phase angle of 0 or 60 degrees as illustrated in the graph 64 of FIG. 2 for example. Accordingly, the controlling of the DPWM reference angle, along with the DPWM scheme causing the SiC MOSFETs 52 to not switch for one third of the fundamental cycle, can thus result in minimizing the switching losses in the PV inverter 22.

For generating a DPWM reference at differing phase angles, the adaptive DPWM phase angle module 60 is provided as part of the controller 44. As one part of determining a desired phase angle for the DPWM reference, the adaptive DPWM phase angle module 60 receives as an input a power factor of the PV inverter 22. For different PV converter operating power factors, the phase angle between voltage and current will be different, and thus the optimal phase angle for DPWM to minimize losses in the PV inverter 22 will also be different—and the adaptive DPWM phase angle module 60 includes an algorithm thereon by which the optimal DPWM phase angle is determined based on the power factor. In general, when minimizing losses strictly/solely in the PV inverter 22, the optimal DPWM phase angle will be between 30 and 60 degrees for lagging power factors at less than unity and will be between 0 and 30 degrees for leading power factors at less than unity. More specifically, the optimal DPWM phase angle will be set to 0° for leading power factors less than 0.866 and set to 60° for lagging power factors less than 0.866, with the optimal DPWM phase angle transitioning to 30° as the leading/lagging power factors transition move toward unity (i.e., power factor equals 1). Modifying the DPWM phase angle in such a fashion results in the inverter losses being reduced compared to conventional DPWM with 30 degree phase.

While determination of the DPWM reference phase angle based on the PV inverter power factor provides for a minimization of switching losses in the PV inverter 22, it is recognized that overall system efficiency of the PV power system 10 may not be optimized with a DPWM reference whose phase angle is based solely on the PV inverter power factor. That is, in addition to switching losses in the PV inverter 22, losses associated with other system components in the PV power system 10 are also present during system operation—with line reactor losses and filter losses being major loss contributors in the PV power system 10. With respect to such line reactor losses and filter losses, it is recognized that the use of different phase angles in the reference waveform results in different output current harmonic components being generated and that these current harmonic components can increase the level of line reactor losses and filter losses in the PV power system 10. More specifically, iron loss in the line reactors 24 is sensitive to current harmonic components and, as the current harmonic component depends on the phase angle of the DPWMs, the reactor iron losses are impacted by current harmonic components (particularly higher order harmonics) such that DPWM with different phase angles will lead to different reactor losses. Similarly for filter losses, filter losses are mainly damping resistor losses that are impacted by the total RMS filter current flowing therethrough—with the RMS filter current being largely determined by its harmonic component such that filter losses are also impacted by the phase angle of the DPWM. Therefore, the total PV power system losses may not be optimized if only the PV inverter losses are optimized based on a determined operating power factor of the system.

In light of the above, an exemplary embodiment of the adaptive DPWM phase angle module 60 receives an additional input of the PV power system operating efficiency in order to determine and generate a DPWM reference phase angle that optimizes overall PV power system losses. A real time system efficiency of the PV power system 10 is determined via the real time efficiency calculation module 62 of controller 44, with the determined efficiency being input to the adaptive DPWM phase angle module 60 in order to calculate an optimal DPWM phase angle or shift that optimizes overall PV power system losses. In an exemplary embodiment, the adaptive DPWM phase angle module 60 functions as a "perturb and observe" type control/module to find the optimal DPWM phase shift that maximizes the overall PV power system efficiency. The optimal DPWM phase angle calculated by the adaptive DPWM phase angle module 60 can then be output to the DPWM modulator 58—with the DPWM modulator 58 then generating gating signals for switching the SiC MOSFETs 52 of PV inverter 22 according to a DPWM scheme with the optimal phase angles.

Figure 3:
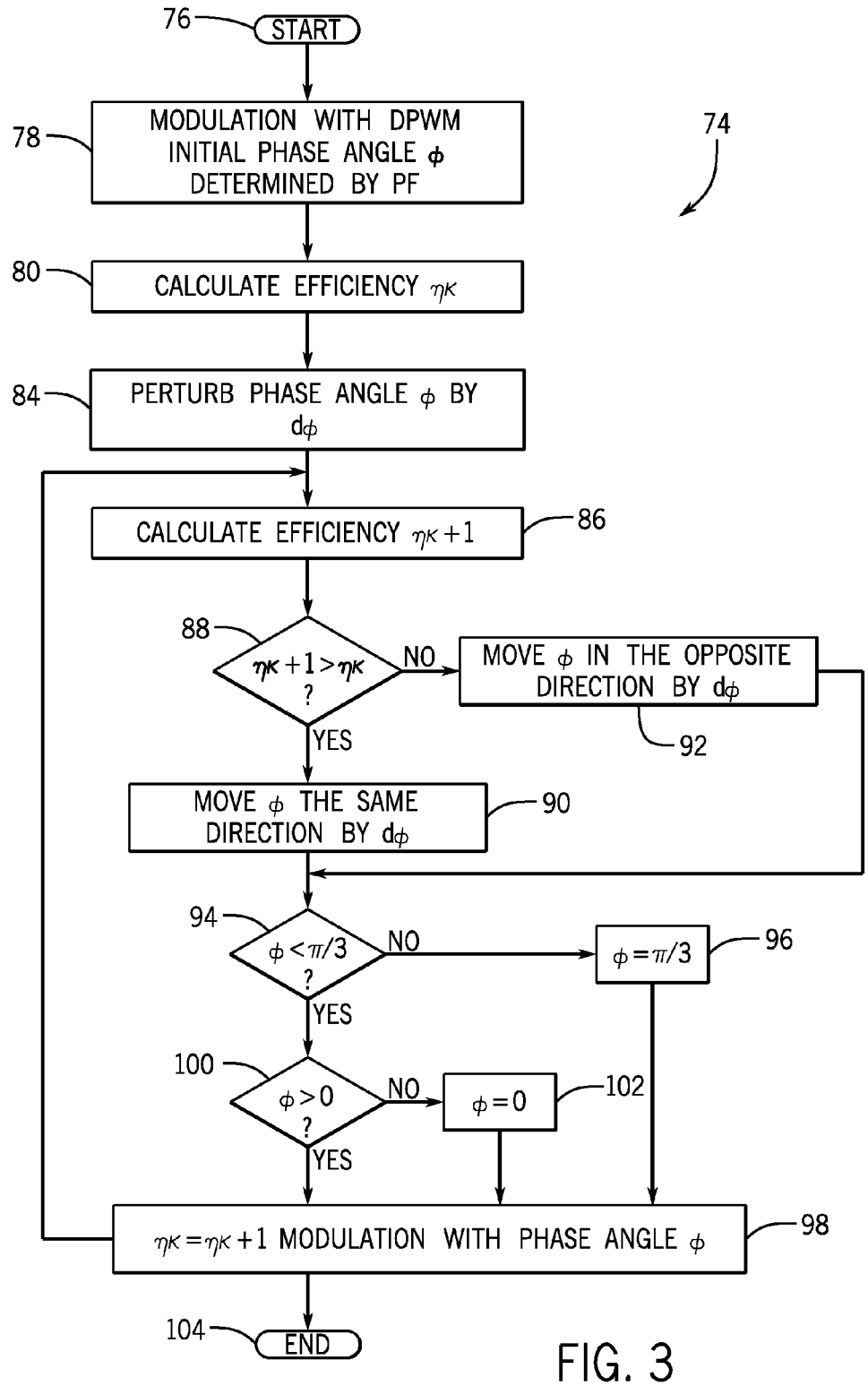
FIG. 3 is a technique for adaptively calculating an optimal DPWM phase angle for operation of a power inverter of a PV power system, according to an embodiment of the invention.

Referring now to FIG. 3, and with reference back to FIG. 1, a technique 74 for adaptively calculating an optimal DPWM phase angle for operation of a power inverter (e.g. PV inverter 22) of a PV power system is illustrated according to an exemplary embodiment. Upon starting of the technique 74 at STEP 76, modulation of a DPWM signal at an initial phase angle $\phi$ is performed at STEP 78—with the initial phase angle $\phi$ being determined based on an operating power factor of the PV inverter 22. The power factor can be determined via any of a number of known methods and/or devices, with the PV power system 10 in FIG. 1 determining the power factor via current and voltage data provided to the efficiency calculation module 62 of controller 44. The determined power factor is output from the efficiency calculation module 62 to the adaptive DPWM phase angle module 60, which subsequently determines an initial DPWM optimal phase angle $\phi$ based on the power factor and outputs a DPWM at an initial phase angle to the DPWM modulator 58 to generate a desired signal.

Figure 4:
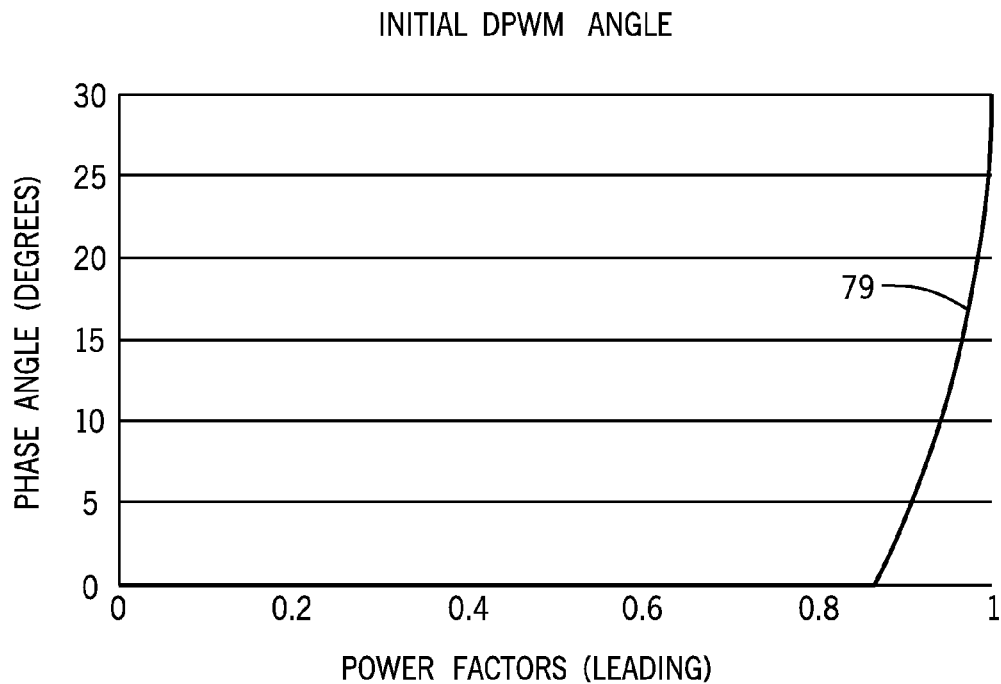
FIGS. 4 and 5 illustrate optimal initial DPWM phase angles for use in the technique of FIG. 3 for different leading and lagging power factors, respectively.
Figure 5:
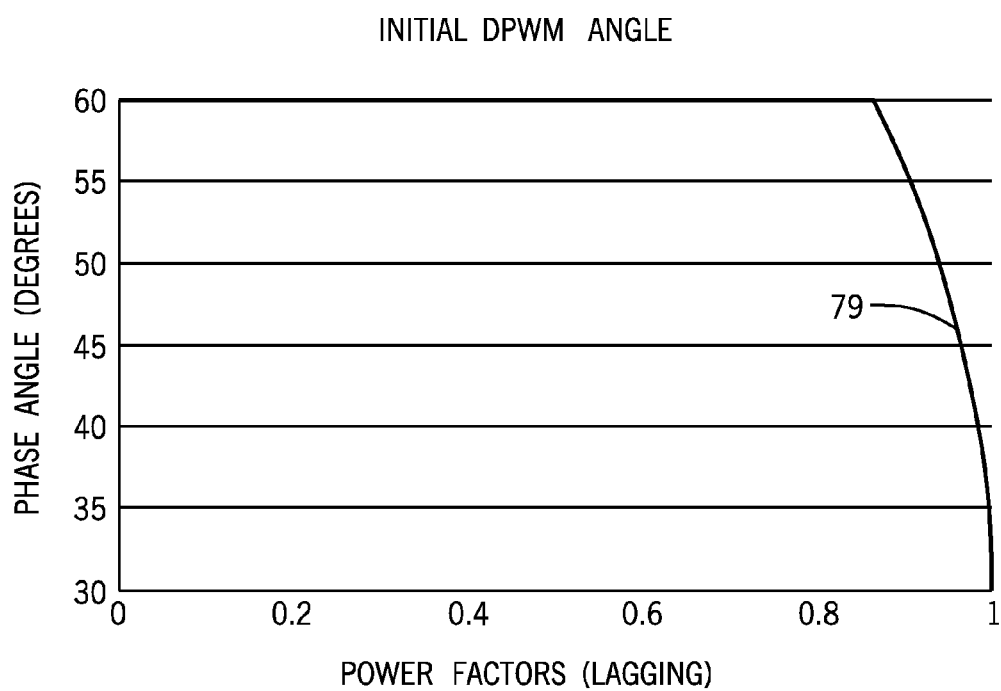

In an exemplary embodiment, and as illustrated in FIGS. 4 and 5, the initial DPWM optimal phase angle $\phi$, indicated at 79, is set to 0° for leading power factors less than 0.866 (FIG. 7) and is set to 60° for leading power factors less than 0.866 (FIG. 8), with the initial DPWM optimal phase angle ϕ transitioning to 30° as the leading/lagging power factors transition move toward unity (i.e., power factor equals 1).

Referring again now to FIG. 3, upon outputting DPWM signals at an initial optimal phase angle ϕ, the technique continues at STEP 80 with a calculation of the PV power system efficiency, $\eta_k$. For calculating the efficiency $\eta_k$, voltage and current data is collected (using appropriate voltage and current sensors 82, as shown in FIG. 1) during operation of the PV power system 10, and such data is provided to the efficiency calculation module 62. The efficiency calculation module 62 then calculates the PV power system efficiency via a known technique (i.e., Efficiency=output power/input power) and provides the efficiency calculation to the adaptive DPWM phase angle module 60.

Upon calculation of the system efficiency $\eta_k$ at STEP 80, the technique 74 continues at STEP 84 with the adaptive DPWM phase angle module 60 functioning to "perturb" the initial phase angle ϕ by a pre-determined angular amount dϕ (e.g., 3 degrees)—with the adaptive DPWM phase angle module 60 providing a DPWM phase angle input to the DPWM modulator 58 that causes the DPWM modulator to output a signal with the modified/perturbed DPWM phase angle, ϕ+/−dϕ.

The technique 74 then continues at STEP 86 by calculating the PV power system efficiency $\eta_{k-1}$ that results upon initiating operation of the PV inverter 22 according to the modified/perturbed DPWM phase angle. Upon calculation of the system efficiency $\eta_{k+1}$, a determination is then made at STEP 88 of whether the system efficiency $\eta_{k+1}$ resulting from the perturbed DPWM phase angle is improved from (i.e., greater than) the system efficiency $\eta_k$ that was achieved via application of the initial perturbed DPWM phase angle ϕ. If it is determined at STEP 88 that the efficiency $\eta_{k+1}$ is greater than the efficiency $\eta_k$, then technique continues at STEP 90 by moving the DPWM phase angle in the direction of the perturbation by the amount dϕ. Conversely, if it is determined at STEP 88 that the efficiency $\eta_{k+1}$ is less than the efficiency $\eta_k$, then technique continues at STEP 92 by moving the DPWM phase angle in the opposite direction of the perturbation by the amount dϕ.

Upon shifting of the DPWM phase angle in the appropriate direction by the amount dϕ, the technique 74 continues at STEP 94 by determining whether the DPWM phase angle is greater or less than a pre-set or pre-determined value, with an exemplary embodiment of the invention determining whether the DPWM phase angle is greater or less than the value π/3 (ϕ<π/3). If it is determined that the DPWM phase angle is greater than the pre-determined value (π/3), the DPWM phase angle is then set to that pre-determined value (π/3) at STEP 96 (i.e., 60°) and the technique 74 continues by performing a modulation of the DPWM at the pre-determined value (π/3) at STEP 98, along with a setting/determining of an updated efficiency based on this phase angle. Conversely, if it is determined at STEP 94 that the DPWM phase angle is less than the pre-determined value (π/3), the technique 74 continues by determining at STEP 100 whether the DPWM phase angle is greater than zero. If it is determined at STEP 100 that the DPWM phase angle is not greater than zero, the DPWM phase angle is then set to 0° at STEP 102 and the technique 74 continues by performing a modulation of the DPWM with a phase angle of zero at STEP 98, along with a setting/determining of an updated efficiency based on this phase angle. If it is determined at STEP 100 that the DPWM phase angle is greater than zero, the technique 74 continues by performing a modulation of the DPWM at the modified/perturbed DPWM phase angle, (i.e., ϕ+/−dϕ) at STEP 98, along with a setting/determining of an updated efficiency based on this phase angle.

If operation of the PV power system 10 and PV inverter 22 is ongoing, the technique 74 loops back to STEP 86 upon completion of STEP 98 for an additional iteration of the DPWM phase angle optimization algorithm—with the system efficiency again being input/determined by controller 44 and a perturb and observe algorithm being employed thereby to continue to optimize the DPWM phase angle and maximize the PV power system efficiency. If operation of the PV power system 10 and PV inverter 22 has terminated, the technique 74 may (upon completion of STEP 98) then terminate at STEP 104.

Beneficially, embodiments of the invention thus provide a PV power system and method of operation thereof—via an adaptive DPWM phase angle algorithm—that utilizes DPWM to reduce power inverter losses in the system, but with the DPWM being applied and optimized to maximize the overall PV power system efficiency for full KVA range including low power factor operating conditions. The adaptive DPWM phase angle algorithm employed to operate the inverter also serves to effectively reduce switch stress on the switching devices of the inverter (e.g., SiC MOSFETs) and therefore increase the reliability of the inverter.

A technical contribution for the disclosed method and apparatus is that it provides for a controller implemented technique for controlling switching in a three-phase inverter so as to maximize operating efficiency of the overall power system. A DPWM scheme with adaptive phase angles is employed by the controller to control operation of the inverter so as to maximize an efficiency of the power system as a whole.

Therefore, according to one embodiment of the present invention, a power system includes a three-phase inverter having a DC link that receives a DC output from a power source and an arrangement of switching devices connected to the DC link and selectively operable in On and Off states to invert the DC output to an AC output having controlled current and voltage. The power system also includes a controller programmed to selectively control operation of the arrangement of switching devices via a discontinuous pulse width modulation (DPWM) scheme, so as to regulate an average voltage of the AC output. In controlling operation of the arrangement of switching devices via the DPWM scheme, the controller is further programmed to generate a DPWM reference waveform having an initial phase angle, determine a system efficiency of the power system during operation thereof, calculate an optimal phase angle for the DPWM reference waveform based on the determined system efficiency, and generate a DPWM reference waveform having the calculated optimal phase angle.

According to another embodiment of present invention, a controller-based method of controlling a three-phase inverter in a power system includes determining an operating power factor of the three-phase inverter, determining an overall system efficiency of the power system during operation thereof, and controlling operation of the three-phase inverter via a discontinuous pulse width modulation (DPWM) control scheme, with an optimal phase angle of a DPWM reference waveform of the DPWM control scheme being determined based on the determined power factor and overall system efficiency. Controlling operation of the arrangement of three-phase inverter via a DPWM scheme with a DPWM reference waveform having the optimal phase angle maximizes the system efficiency of the power system over a full KVA operating range.

According to yet another embodiment of the present invention, a controller for controlling operation of a three-phase inverter in a power system includes an efficiency calculation module programmed to determine an operating power factor of the three-phase inverter, determine an overall system efficiency of the power system during operation thereof, and generate an output comprising the determined operating power factor and overall system efficiency. The controller also includes an adaptive DPWM phase angle module operably connected to the efficiency calculation module to receive the output therefrom, the adaptive DPWM phase angle module programmed to determine an optimal phase angle of a DPWM reference waveform in a DPWM control scheme based on the determined operating power factor and overall system efficiency. The controller further includes a DPWM modulator programmed to generate gating signals for controlling the three-phase inverter, the gating signals generated according to the DPWM control scheme having the DPWM reference waveform at the optimal phase angle.

The present invention has been described in terms of the preferred embodiment, and it is recognized that equivalents, alternatives, and modifications, aside from those expressly stated, are possible and within the scope of the appending claims.

What is claimed is:

1. A power system comprising:
 a three-phase inverter comprising:
  a DC link that receives a DC output from a power source;
  an arrangement of switching devices connected to the DC link and selectively operable in On and Off states to invert the DC output to an AC output having controlled current and voltage; and
 a controller programmed to selectively control operation of the arrangement of switching devices via a discontinuous pulse width modulation (DPWM) scheme, so as to regulate an average voltage of the AC output;
 wherein, in controlling operation of the arrangement of switching devices via the DPWM scheme, the controller is further programmed to:
  generate a DPWM reference waveform having an initial phase angle;
  determine a system efficiency of the power system during operation thereof;
  calculate an optimal phase angle for the DPWM reference waveform based on the determined system efficiency; and
  generate a DPWM reference waveform having the calculated optimal phase angle.

2. The power system of claim 1 wherein controlling operation of the arrangement of switching devices via a DPWM scheme with a DPWM reference waveform having the calculated optimal phase angle maximizes the system efficiency of the power system over a full KVA operating range.

3. The power system of claim 1 wherein the controller is further programmed to:
 determine an operating power factor of the three-phase inverter; and
 generate a DPWM reference waveform having the initial phase angle based on the determined operating power factor.

4. The power system of claim 1 wherein, in calculating an optimal phase angle for the DPWM reference waveform, the controller is further programmed to employ a perturb and observe adaptive phase angle algorithm.

5. The power system of claim 4 wherein, in employing the perturb and observe adaptive phase angle algorithm, the controller is further programmed to:
 determine a first system efficiency of the power system based on operation of the three-phase inverter according to a DPWM scheme having a DPWM reference waveform with the initial phase angle;
 perturb the initial phase angle of the DPWM reference waveform by a pre-determined angular amount;
 determine a second system efficiency of the power system based on operation of the three-phase inverter according to a DPWM scheme having a DPWM reference waveform with the perturbed phase angle;
 compare the second system efficiency to the first system efficiency; and
 calculating an optimal phase angle for the DPWM reference waveform based on the comparison of the second system efficiency to the first system efficiency.

6. The power system of claim 5 wherein the controller is further programmed to:
 shift the phase angle of the DPWM reference waveform in the direction of the perturbation if the second system efficiency is greater than the first system efficiency; and
 shift the phase angle of the DPWM reference waveform in the direction opposite of the perturbation if the second system efficiency is less than the first system efficiency.

7. The power system of claim 1 wherein the arrangement of switching devices comprises an arrangement of silicon carbide (SiC) MOSFETs.

8. The power system of claim 7 wherein the power system comprises a photovoltaic (PV) power system, the PV power system further comprising line reactors and RC filters through which the AC power is fed to a power grid; and
 wherein controlling operation of the arrangement of switching devices of the three-phase inverter via the DPWM scheme with a DPWM reference waveform having the calculated optimal phase angle reduces line reactor losses and filter losses as compared to operation of the arrangement of switching devices of the three-phase inverter via the DPWM scheme with a DPWM reference waveform having the initial phase angle.

9. The power system of claim 1 wherein the optimal phase angle of the DPWM reference waveform is between 0 and 60 degrees.

10. A controller-based method of controlling a three-phase inverter in a power system, the method comprising:
 determining an operating power factor of the three-phase inverter;
 determining an overall system efficiency of the power system during operation thereof;
 controlling operation of the three-phase inverter via a discontinuous pulse width modulation (DPWM) control scheme, with an optimal phase angle of a DPWM reference waveform of the DPWM control scheme being determined based on the determined power factor and overall system efficiency;
 wherein controlling operation of the arrangement of three-phase inverter via a DPWM scheme with a DPWM reference waveform having the optimal phase angle maximizes the system efficiency of the power system over a full KVA operating range.

11. The method of claim 10 further comprising:
 generating a DPWM reference waveform having an initial phase angle based on the determined operating power factor;

determining a first system efficiency of the power system based on operation of the three-phase inverter according to a DPWM scheme having a DPWM reference waveform with the initial phase angle;

perturbing the initial phase angle of the DPWM reference waveform by a pre-determined angular amount;

determining a second system efficiency of the power system based on operation of the three-phase inverter according to a DPWM scheme having a DPWM reference waveform with the perturbed phase angle;

comparing the second system efficiency to the first system efficiency; and calculating the optimal phase angle for the DPWM reference waveform based on the comparison of the second system efficiency to the first system efficiency.

12. The method of claim 11 further comprising:

shifting the phase angle of the DPWM reference waveform in the direction of the perturbation if the second system efficiency is greater than the first system efficiency; and shifting the phase angle of the DPWM reference waveform in the direction opposite of the perturbation if the second system efficiency is less than the first system efficiency.

13. The method of claim 11 wherein the optimal phase angle of the DPWM reference waveform is between 0 and 60 degrees.

14. The method of claim 13 wherein the initial phase angle of the DPWM reference waveform is 0 degrees for leading power factors less than 0.866 and 60 degrees for lagging power factors less than 0.866.

15. The method of claim 10 wherein controlling operation of the three-phase inverter comprises controlling switching of a plurality of silicon carbide (SiC) MOSFETs of the three-phase inverter via gating signals according to the DPWM control scheme with the optimal phase angle of the DPWM reference waveform.

16. The method of claim 10 wherein, in maximizing the system efficiency of the power system over a full KVA operating range, the optimal phase angle for the DPWM reference waveform reduces line reactor losses and filter losses in the power system.

17. A controller for controlling operation of a three-phase inverter in a power system, the controller comprising:

an efficiency calculation module programmed to:
  determine an operating power factor of the three-phase inverter;
  determine an overall system efficiency of the power system during operation thereof; and
  generate an output comprising the determined operating power factor and overall system efficiency;

an adaptive DPWM phase angle module operably connected to the efficiency calculation module to receive the output therefrom, the adaptive DPWM phase angle module programmed to determine an optimal phase angle of a DPWM reference waveform in a DPWM control scheme based on the determined operating power factor and overall system efficiency; and a DPWM modulator programmed to generate gating signals for controlling the three-phase inverter, the gating signals generated according to the DPWM control scheme having the DPWM reference waveform at the optimal phase angle.

18. The controller of claim 17 wherein:

the adaptive DPWM phase angle module is programmed to generate a DPWM reference waveform having an initial phase angle based on the determined operating power factor;

the efficiency calculation module is programmed to determine a first system efficiency of the power system based on operation of the three-phase inverter according to a DPWM scheme having a DPWM reference waveform with the initial phase angle;

the adaptive DPWM phase angle module is programmed to cause the DPWM modulator to perturb the initial phase angle of the DPWM reference waveform by a pre-determined angular amount;

the efficiency calculation module is programmed to determine a second system efficiency of the power system based on operation of the three-phase inverter according to a DPWM scheme having a DPWM reference waveform with the perturbed phase angle; and the adaptive DPWM phase angle module is programmed to:
  compare the second system efficiency to the first system efficiency; and
  calculate the optimal phase angle for the DPWM reference waveform based on the comparison of the second system efficiency to the first system efficiency.

19. The controller of claim 18 wherein the adaptive DPWM phase angle module is further programmed to:

shift the phase angle of the DPWM reference waveform in the direction of the perturbation if the second system efficiency is greater than the first system efficiency; and shift the phase angle of the DPWM reference waveform in the direction opposite of the perturbation if the second system efficiency is less than the first system efficiency.

20. The controller of claim 17 wherein the optimal phase angle of the DPWM reference waveform is between 0 and 60 degrees.

* * * * *